US005901840A

United States Patent [19]

Nakasuji

[11] Patent Number: 5,901,840

[45] Date of Patent: May 11, 1999

[54] SECURITY CASE FOR A RECORDED MEDIA CONTAINER

[75] Inventor: Tamotsu Nakasuji, Higashiosaka, Japan

[73] Assignee: Sanei Co., Ltd., Osaka, Japan

[21] Appl. No.: 08/870,769

[22] Filed: May 16, 1997

[30] Foreign Application Priority Data

Aug. 9, 1996 [JP] Japan .................................... 8-210664

[51] Int. Cl.[6] ........................... A45C 13/10; B65D 55/14; B65D 85/57

[52] U.S. Cl. ............................ 206/1.5; 70/63; 206/308.2; 206/387.11

[58] Field of Search ........................... 206/387.1, 387.11, 206/308.2, 1.5, 308.1, 309; 70/63

[56] References Cited

U.S. PATENT DOCUMENTS

| | | |
|---|---|---|
| D. 329,594 | 9/1992 | Gregerson et al. . |
| 344,126 | 6/1886 | Meaker . |
| 1,950,165 | 3/1934 | DeLorenzo . |
| 2,293,942 | 8/1942 | Klahn . |
| 2,672,747 | 3/1954 | Craig . |
| 3,125,873 | 3/1964 | Robinson . |
| 3,272,325 | 9/1966 | Schoenmakers . |
| 3,348,668 | 10/1967 | Amatsu et al. . |
| 3,452,878 | 7/1969 | Smith . |
| 3,495,716 | 2/1970 | Gregory . |
| 3,504,652 | 4/1970 | Norman . |
| 3,570,676 | 3/1971 | Crosslen . |
| 3,613,413 | 10/1971 | Glass et al. . |
| 3,638,788 | 2/1972 | Solomon . |
| 3,700,098 | 10/1972 | Posso . |
| 3,722,236 | 3/1973 | Zelenko . |
| 3,736,777 | 6/1973 | Wirth . |
| 3,746,180 | 7/1973 | Spiroch et al. . |
| 3,776,374 | 12/1973 | Medendorp . |
| 3,828,922 | 8/1974 | Holkestad . |
| 3,871,516 | 3/1975 | Holkestad et al. . |
| 3,933,240 | 1/1976 | Humble . |
| 3,982,633 | 9/1976 | Pennington . |
| 3,994,395 | 11/1976 | Bennett-Robertson . |
| 4,047,410 | 9/1977 | Close . |
| 4,102,458 | 7/1978 | Fors . |
| 4,105,112 | 8/1978 | Graf . |

(List continued on next page.)

FOREIGN PATENT DOCUMENTS

| | | |
|---|---|---|
| 66317 | 8/1914 | Austria . |
| 954843 | 10/1947 | France . |
| 2 508 301 | 12/1982 | France . |
| 23 35 965 | 1/1975 | Germany . |
| 24 33 570 | 1/1976 | Germany . |
| 2801567 | 7/1979 | Germany . |
| 54-057706 | 4/1979 | Japan . |
| 55-45197 | 3/1980 | Japan . |
| 1 373 004 | 11/1974 | United Kingdom . |
| 1 459 996 | 12/1976 | United Kingdom . |
| 2 037 157 | 7/1980 | United Kingdom . |
| 2 037 158 | 7/1980 | United Kingdom . |

*Primary Examiner*—Bryon P. Gehman
*Attorney, Agent, or Firm*—Merchant, Gould, Smith, Edell, Welter & Schmidt, P.A.

[57] ABSTRACT

A holder for a container for a recorded medium such as a compact disk, a cassette tape, etc. comprising a holder main body for containing the recorded media container and a locking member for preventing the container from being removed. The holder main body has an open area for receiving and releasing the container and an engagement section formed on one of its peripheral sides. When a plurality of pressable pawls formed on the locking member are inserted into a plurality of through holes formed on the engagement section of the holder main body so as to prevent the locking member from being removed from the holder main body, the locking member covers at least part of the open area and confronts the container. The locking member is removed from the holder main body only by a lock releasing tool that has a plurality of projections which simultaneously press all of the plurality of pawls of the locking member.

21 Claims, 8 Drawing Sheets

U.S. PATENT DOCUMENTS 4,125,189 11/1978 Fujimoto et al. .
4,187,703 2/1980 Ippoliti et al. .
4,240,551 12/1980 Osanai .
4,241,859 12/1980 Eames .
4,243,142 1/1981 Foreman .
4,245,741 1/1981 Holkestad .
4,278,258 7/1981 Fujita et al. .
4,285,429 8/1981 MacTavish .
4,293,266 10/1981 St. Lawrence et al. .
4,299,870 11/1981 Humble .
4,303,159 12/1981 Stone et al. .
4,327,952 5/1982 Cournoyer et al. .
4,361,233 11/1982 Holkestad .
4,365,712 12/1982 Oishi et al. .
4,366,915 1/1983 Seidler .
4,381,836 5/1983 Rivkin et al. .
4,385,693 5/1983 Gelardi et al. .
4,466,540 8/1984 Lotrous et al. .
4,469,225 9/1984 Takahashi .
4,476,978 10/1984 Saito .
4,558,782 12/1985 Iverson et al. .
4,566,598 1/1986 Fors .
4,589,549 5/1986 Hehn .
4,628,713 12/1986 Cecchi et al. .
4,634,004 1/1987 Mortensen .
4,759,442 7/1988 Gergerson et al. .
4,834,238 5/1989 Hehn et al. .......................... 206/1.5 X
4,865,190 9/1989 Gregerson et al. .
5,129,244 7/1992 Wittman .
5,277,308 1/1994 Finke et al. .......................... 206/1.5 X
5,375,712 12/1994 Weisburn ............................ 206/1.5 X
5,390,515 2/1995 Essick ........................................ 70/63
5,680,782 10/1997 Komatsu et al. ....................... 70/63 X
5,782,350 7/1998 Weisbum et al. ................... 206/308.2
B1 4,589,549 7/1994 Hehn .

SECURITY CASE FOR A RECORDED MEDIA CONTAINER

BACKGROUND 0F THE INVENTION

1. Field of the Invention

The present invention relates to a holder, and more particularly, to a holder for a container for, for instance, a compact disk, a video tape or a cassette tape, on which music, movies, game programs or the like are recorded (called a "recorded medium").

2. Prior Art

Retail shops and rental shops of compact disks, cassette tapes, etc. use special holders for displaying he containers of compact disks, cassette tapes, etc. FIG. 7 shows one of such holders.

This holder is composed of a holder main body 90, a container receiving member 91 provided at the bottom of the holder main body 90, and a lock mechanism 92. The holder main body 90 has an open area 90*a* at the side thereof for receiving and releasing the container. The container receiving member 91 is movable in and out of the holder main body 90 and then becomes immovable when the lock mechanism 92 engages the container receiving member 91, so that the container cannot be taken out of the holder main body 90. When, as seen from FIG. 8, a magnet 93 having strong attraction power causes a pin 92*a* of the lock mechanism 92 to move downward in FIG. 8 against the spring force of a spring 92*b* of the lock mechanism 92, the pin 92*a* is disengaged from the obtainer receiving member 91, thus allowing the container to be removed from the holder main body 90.

This type of holder customarily has a theft detection tag (not shown) attached on the inner surface of the rear plate of the holder main body 90. When one attempts to steal the container in a holder from a shop, the theft detection tag attached to the holder is detected when passing through the detection gate installed at the exit of the shop.

Therefore, before taking the desired recorded medium contained in the container out of the shop, a shop clerk at the counter before the detection gate must first release the lock mechanism 92 of the holder and take the container out of the holder.

However, the holder described above is disadvantaged in that if a person (other than a shop clerk) has a magnet with strong attraction power, this person can easily release the lock mechanism 92. Thus, thefts cannot be prevented effectively despite the use of the detection gate.

SUMMARY OF THE INVENTION

According , it is an object of the present invention to provide a holder for a recorded media container capable of effectively preventing a theft thereof.

The holder for a recorded media container of the present invention comprises a holder main body for holding recorded media container and a locking means for preventing the container from being removed from the holder main body. The holder main body is provided with an open area for receiving and releasing the container and an engagement section which is formed on one of the peripheral sides of the holder main body. When the locking means is inserted into and engaged with the engagement section of the holder main body, the locking means covers at least part of the open area and confronts the container so that the container is not taken out of the holder main body. The locking means is provided with a plurality of pressable pawls; and when the pawls are inserted into a plurality of through holes formed in the engagement section of the holder main body, the locking means is prevented from being removed from the holder main body. The engagement of the holder main body and the locking means can be released only by a lock releasing means that has a plurality of projections which simultaneously press all of the plurality of pawls through the through holes of the holder main body and disengage the pawls from the through holes.

DETAILED DESCRIPTION OF THE PREFERRED EMBODIMENT

Figure 1:
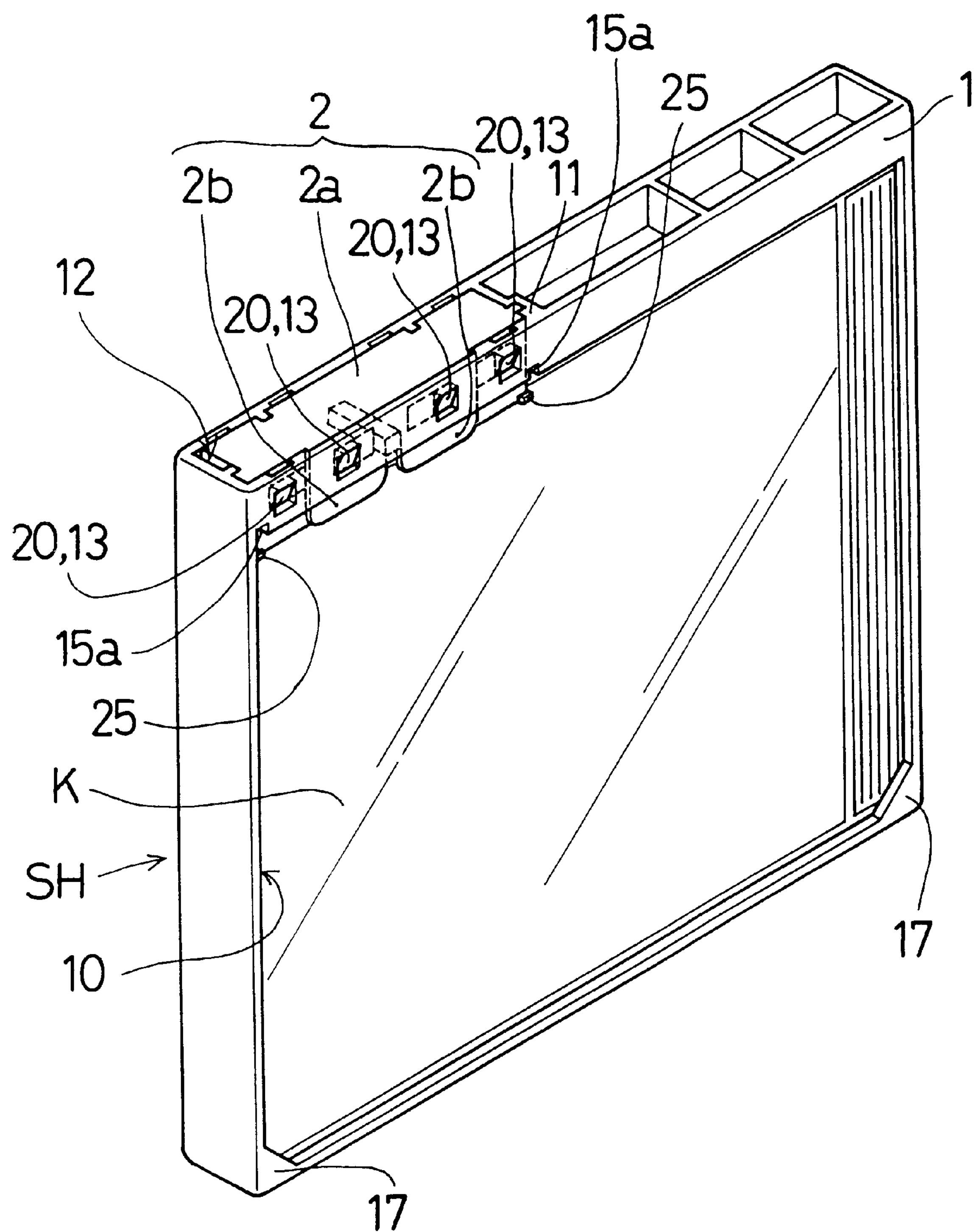
FIG. 1 is a perspective view of an embodiment of a holder for a recorded media container of the present invention, the holder holding the recorded media container therein.

FIG. 1 shows a holder SH for a recorded media container K of the present invention, and the container K is held in this holder SH.

Figure 2:
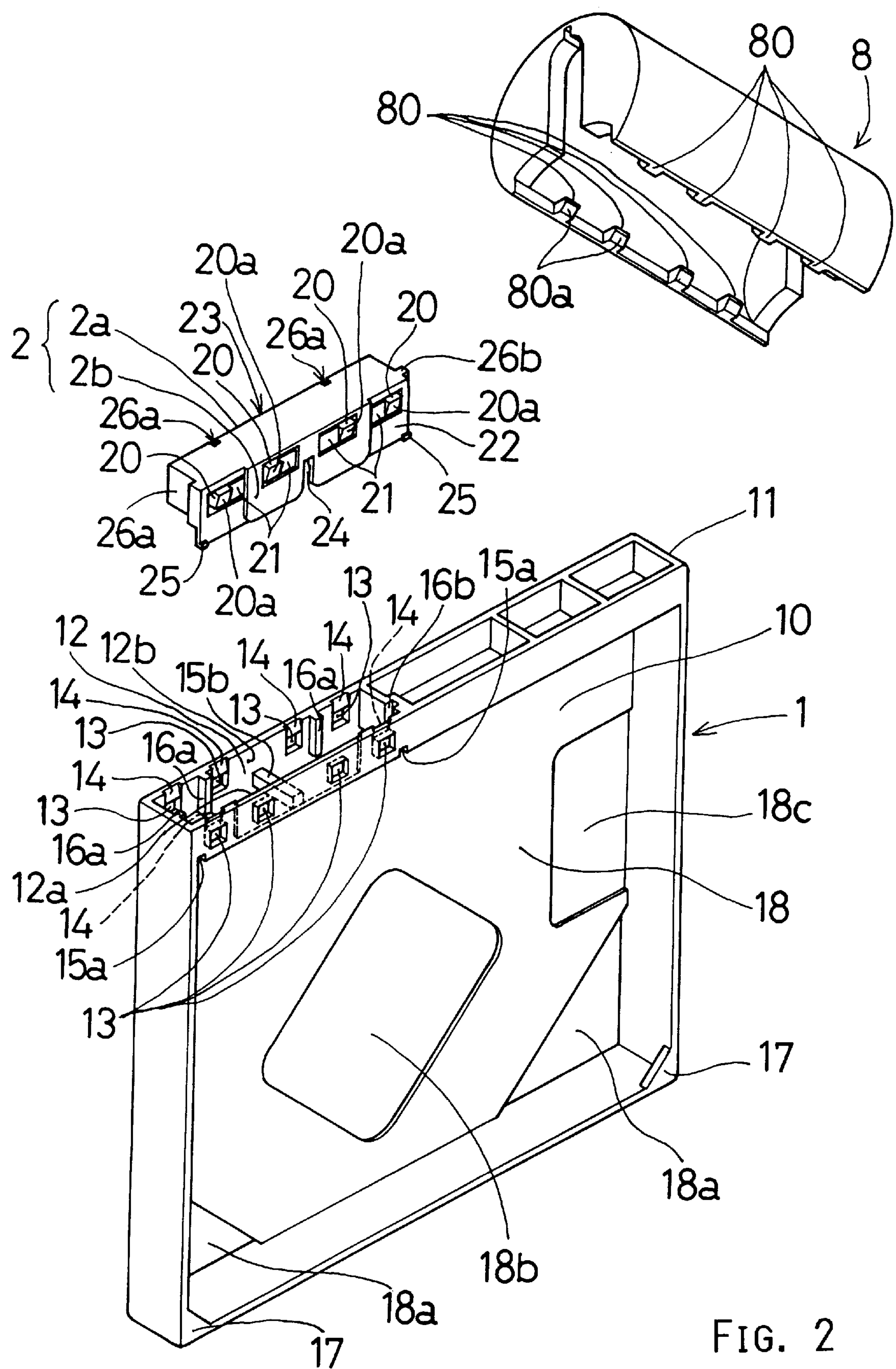
FIG. 2 is a front perspective view of a holder main body of the holder of FIG. 1, a locking means and a lock releasing means being also shown therein.
Figure 5:
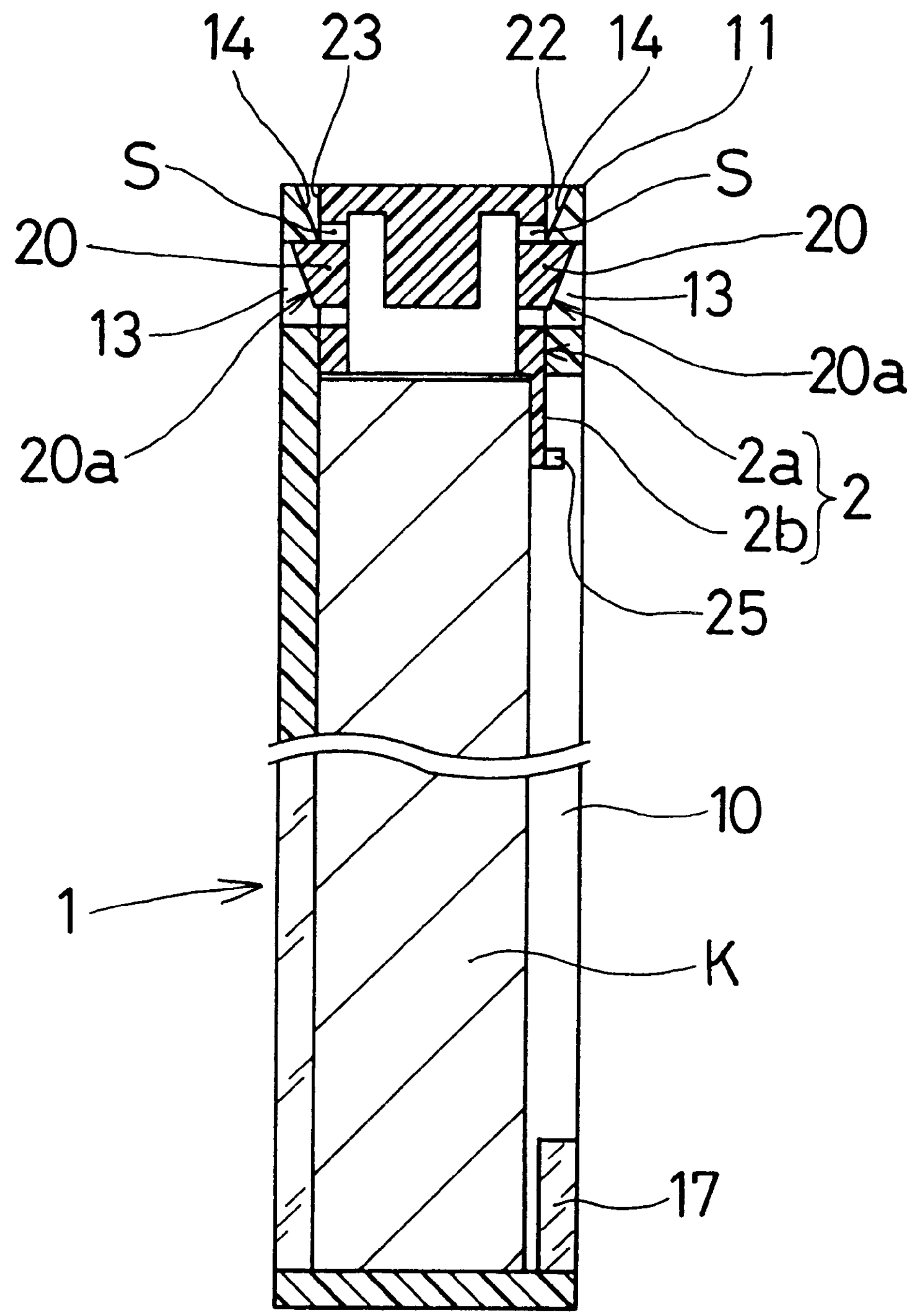
FIG. 5 is a longitudinal sectional view of the holder of FIG. 1.
Figure 6:
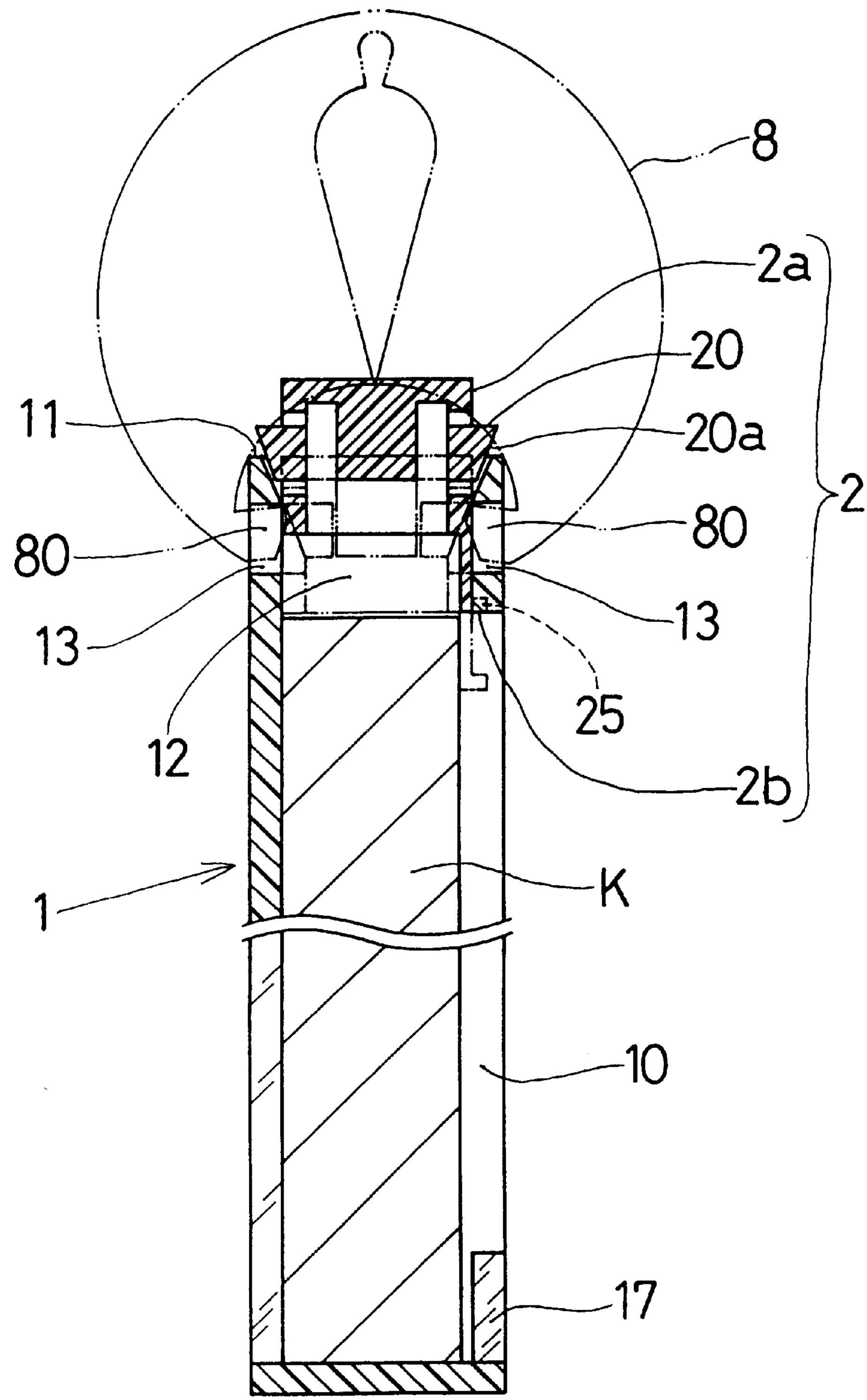
FIG. 6 is a longitudinal sectional view of the holder main body of FIG. 5 with the lock releasing means releasing the locking means from the holder main body.
Figure 7:
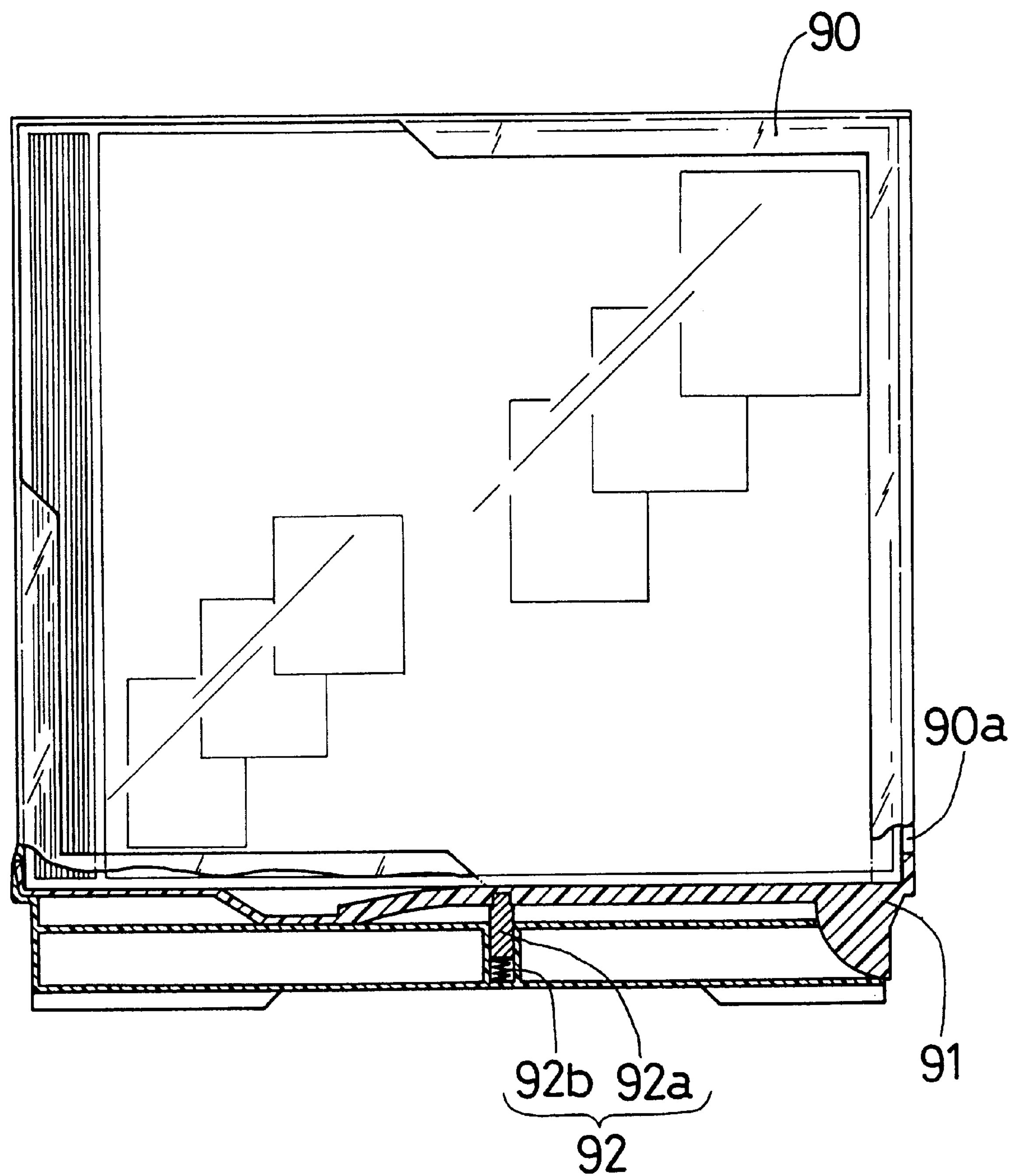
FIG. 7 is a partially sectional view of a conventional holder for a recorded media container.
Figure 8:
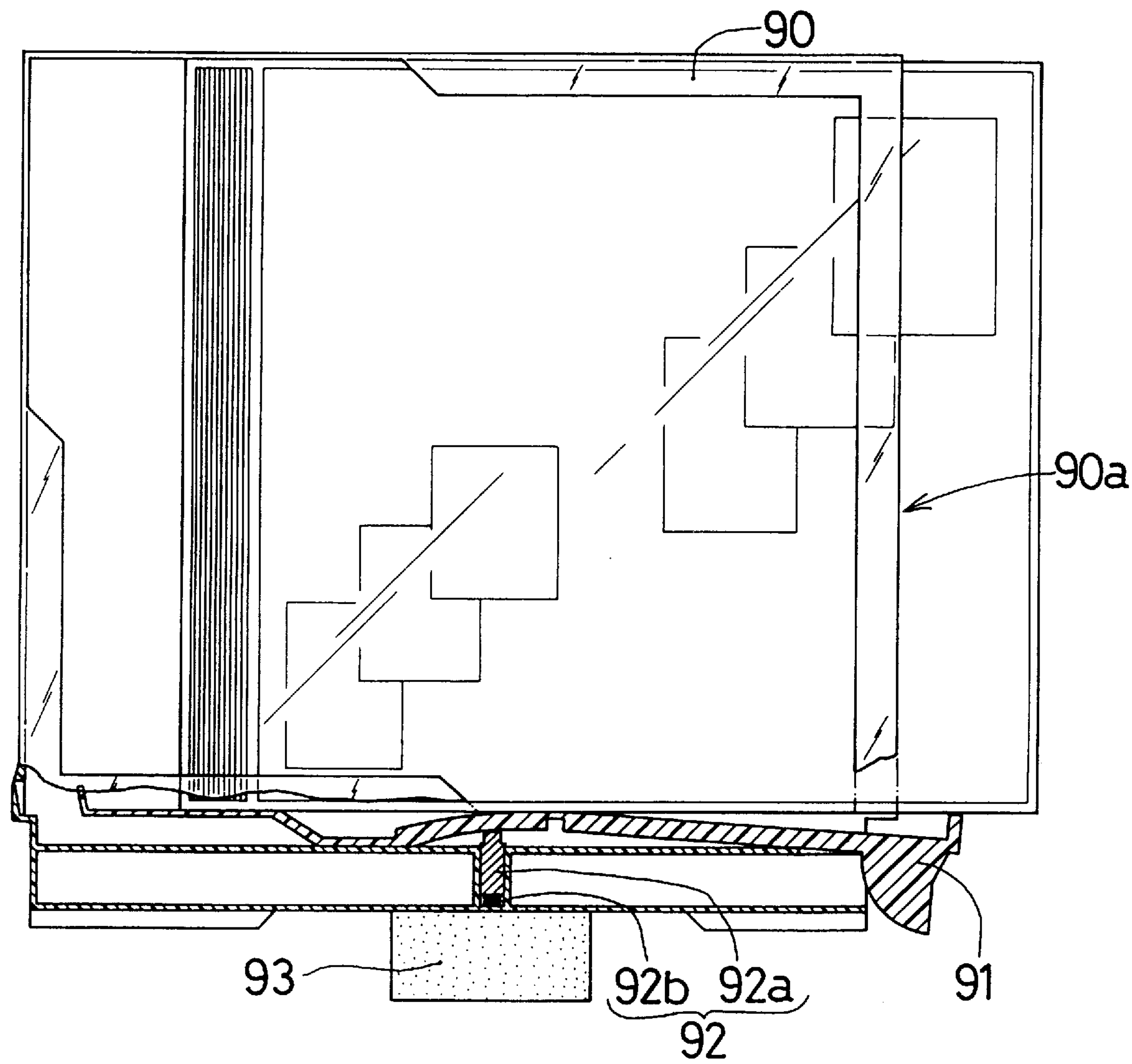
FIG. 8 is a partially sectional view of the conventional holder of FIG. 7, wherein a lock mechanism of the holder is released.

The holder SH, as shown in FIGS. 1 and 2, comprises a holder main body 1, and a locking means 2 releasably engaged with one of the peripheral sides 11 of the holder main body 1. The locking means 2 is released from the holder main body 1 by a lock releasing means 8 shown in FIG. 2. Before being released, the locking means 2 is in the inserted state as shown in FIG. 5; and after being released, the locking means 2 projects out, as shown in FIG. 6, so that the container K held in the holder main body 1 can be taken out of the holder main body 1.

The structure of each member of the holder for a recorded media container of the present invention will be described in detail below.

Holder Main The holder main body 1 is made of a synthetic resin and as shown in FIGS. 1 and 2 formed into a shape corresponding to the shape of the recorded media container K. The holder main body 1 has an open area 10 on the front side thereof for receiving and releasing the container K.

The peripheral part above the open area 10 is formed higher so as to form an engagement section 12 in which the locking means 2 is inserted and engaged with the peripheral side 11. As seen from FIG. 2, four through holes 13 are formed on each the front side 12*a* and the rear side 12*b* of the engagement section 12; and a slope 14 is formed on one of the surfaces that form each one of the through holes 13.

Guide pieces 16*a* and guide groove 16*b* are provided on the inner side of the engagement section 12, as shown in FIG. 2, so as to guide the locking means 2 to be inserted into and disengaged from the engagement section 12. Concavities 15a are provided on the holder main body 1 for preventing the locking means 2 from slipping out of the holder main body 1, and a stop piece 15b is provided for preventing the locking means 2 from being inserted more deeply into the engagement section 12 than necessary.

As shown FIG. 2, the holder main body 1 further includes: at least one small stopper means 17 provided in the lower comer of the open area 10 so as to cover part of the open area 10, triangular holes 18a provided on a rear plate 18 so as to confront the stopper means 17, a hole 18b provided in the center of the rear plate 18 in order to facilitate the removal of the container K, and an attachment portion 18c (formed thinner in plate thickness) for sticking thereon a theft detection tag on which a bar code is printed.

Locking Means

Figure 3:
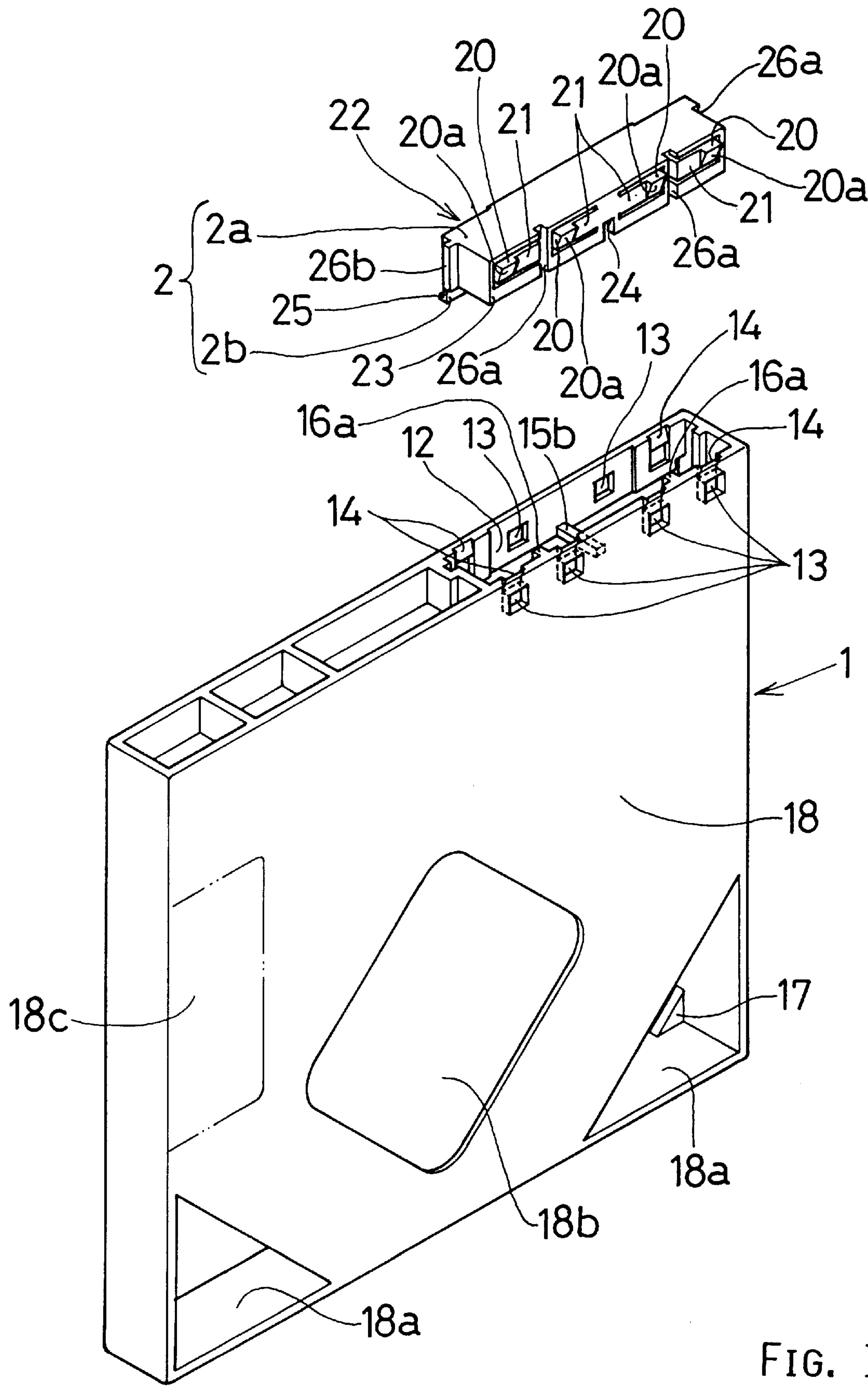
FIG. 3 is a rear perspective view of the holder main body of the holder of FIG. 1, with only the locking means being shown therein.
Figure 4:
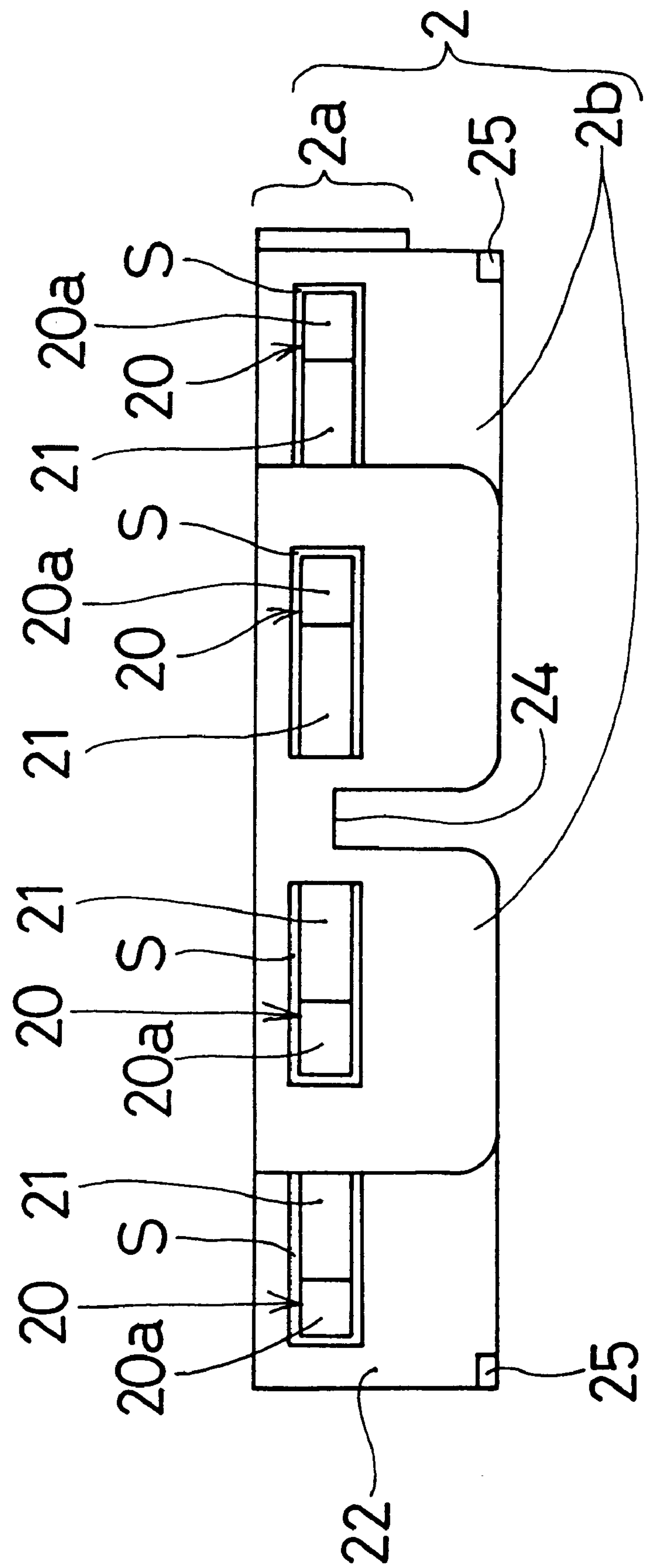
FIG. 4 is a front view of the locking means.

The locking means 2 is made of a synthetic resin, and as shown in FIGS. 2 to 6 it comprises a rectangular parallelepiped body 2a having an opening at the bottom and a pair of cover plates 2b extending below the front surface 22 of the parallelepiped body 2a. As shown in FIGS. 2 to 4, angled C-shaped slits S and angled reversed C-shaped slits S are respectively opened on the front surface 22 and the rear surface 23 of the parallelepiped body 2a, thus forming elastically bendable cantilever-type tongues 21. Pawls 20 are formed at the free ends of the tongues 21 so that the pawls 20 symmetrically correspond in pairs on each the front surface 22 and the rear surface 23 of the parallelepiped body 2a. As best seen from FIG. 5, the pawls 20 project out of the front and rear surfaces 22 and 23; and when pressed, the pawls 20 sink into the front and rear surfaces 22 and 23. As shown in FIG. 5, each of the pawls 20 is provided with a slope 20a so that the upper side of the pawl 20 projects from the front surface 22 or the rear surface 23, and the bottom side of the pawl 20 is almost flush with the front surface 22 or the rear surface 23.

As shown in FIGS. 2 and 3, guide grooves 26a and guide piece 26b are formed on the outer surface of the locking means 2 so as to respectively engage with the guide pieces 16a and the guide groove 16b of the holder main body 1.

As shown in FIGS. 2 and 4, on the front surface 22 of the locking means 2, a recess 24 is formed between he cover plates 2b; and as shown in FIG. 3, on the rear surface 23 of the locking means 2, a recess 24 is formed at a position that corresponds to the recess 24 of the front surface 22. These recesses 24 come into contact with the stop piece 15b of the holder main body 1 so as to prevent the locking means 2 from being inserted more deeply into the engagement section 12 than necessary. As shown in FIGS. 1 and 4, protrusions 25 are formed at the ends of the cover plates 2b of the locking means 2. The protrusions 25 come into contact with the concavities 15a of the main body 1 so as to prevent the locking means 2 from slipping out apart from the holder main body 1.

Lock Releasing Means

As shown in FIG. 2, the lock releasing means 8 is formed by axially cutting out the bottom part of a cylindrical body; and on the cutout edges of the lock releasing means 8, a plurality of projections 80 (having slopes 80a at the tips) are provided at positions corresponding to the through holes 13 of the holder main body 1. The confronting projections 80 of this lock releasing means 8 are designed so as to come closer to each other when the lock releasing means 8 is gripped and pressed diametrically and apart from each other by an elastic restoring force when the gripping force is removed from the lock releasing means 8. As illustrated by the two-dot chain line in FIG. 6, the projections 80 simultaneously press the slopes 20a of the pawls 20 of the locking means 2 in the state shown in FIG. 5. Thus, when pressed, the slopes 20a of the pawls 20 slide over the projections 80 of the lock releasing means 8 and over the slopes 14 of the through holes 13 thanks to the elastic restoring force of the tongues 21 (which is, as described above, made of synthetic resin), so that the locking means 2 pops out of the engagement section 12 and released as shown in FIG. 6.

Since the lock releasing means 8 is not a magnet of an easily available simple shape but is complicated in shape and designed to press the plurality (eight in this embodiment ) pawls 20 simultaneously, a person other than a shop clerk who has the lock releasing means 8 cannot unlock the holder SH Thus, a theft can be effectively prevented by the use of the holder of the present invention together with the conventional detection gate system.

Although the open area 10 is formed on the front side of the holder main body 1 in the above embodiment, it is not limited to be formed on the front side. The open area 10 may be formed on one of the peripheral sides of the holder main body 1 so that the cover plates 2b of the locking means 2 covers (part of) the open area 10 formed on the peripheral side.

Moreover, the number of pawls 20 is not limited to eight.

As see from the above, the holder for a recorded media container of the present invention can hold the container of a compact disk, a video tape, a cassette tape, a game cassette or the like, on which music, movies, game programs or the like are already recorded.

What is claimed is:

1. A security case for holding an object desired to be secured, the security case comprising:

a case housing including a front side positioned opposite from a back side, the case housing defining a storage region formed generally between the front and back sides, the front side of the case housing defining a main opening sized and shaped for allowing the object to be inserted into or removed from the storage region;

the case housing including a front wall that extends along the front side of the case housing, the front wall defining a plurality of front locking openings that extend completely through the front wall;

the case housing including a back wall that extends along the back side of the case housing, the back wall defining a plurality of back locking openings that extend completely through the back wall, the front and back walls being arranged in opposing relation such that a slot is formed between the front and back walls;

a retaining member slidably mounted within the slot between the front and back walls, the retaining member being movable between a first position in which a retaining portion of the retaining member blocks at least a portion of the main opening such that the retaining member is adapted to retain the object within the storage region, and a second position in which the retaining portion is at least partially retracted from the main opening such that the object can be inserted into or removed from the storage region;

front locking members connected to the retaining member for locking the retaining member in the first position, the front locking members being arranged and configured to resiliently move into the front locking openings when the retaining member is moved to the first position; and back locking members connected to the retaining member for locking the retaining member in the first position, the back locking members being arranged and configured to resiliently move into the back locking openings when the retaining member is moved to the first position.

2. The security case of claim 1, wherein the front and back locking members comprise cantilever members.

3. The security case of claim 2, wherein the cantilever members include pawls adapted to project into the front and back locking openings.

4. The security case of claim 3, wherein the pawls have first inclined surfaces.

5. The security case of claim 4, wherein the front and back walls include second inclined surfaces that oppose the first inclined surfaces of the pawls, wherein contact between the first and second inclined surfaces causes the retaining member to be elastically biased toward the second position.

6. The security case of claim 1, further comprising an unlocking tool including opposing first and second jaws, the first jaw including first unlocking members arranged and configured to fit within the front locking openings, the second jaw including second unlocking members arranged and configured to fit within the back locking openings, wherein the front and back locking members are displaced from their corresponding front and back locking openings by positioning the case housing between the first and second locking jaws, aligning the first unlocking members with the front locking openings and the second unlocking members with the back locking openings, and pressing the first and second jaws together such that the first and second locking member displace the front and back locking members from their corresponding front and back locking openings.

7. The security case of claim 6, wherein the unlocking tool includes means for moving the retaining member from the first position toward the second position after the front and back locking members have been displaced from their corresponding front and back locking openings.

8. The security case of claim 7, wherein the means for moving includes inclined surfaces formed on the first and second unlocking members.

9. The security case of claim 8, wherein the inclined surfaces of the unlocking members engage corresponding inclined surfaces formed on the first and second locking members.

10. The security case of claim 1, wherein the object comprises a compact disk case.

11. A security case for holding an object desired to be secured, the security case comprising:

a case housing including a first side positioned opposite from a second side, the case housing defining a storage region formed generally between the first and second sides, the first side of the case housing defining a main opening sized and shaped for allowing the object to be inserted into or removed from the storage region;

the case housing including a first wall that extends along the first side of the case housing, the first wall defining a plurality of first locking openings that extend completely through the first wall;

the case housing including a second wall that extends along the second side of the case housing, the second wall defining a plurality of second locking openings that extend completely through the second wall, the first and second walls being arranged in opposing relation such that a space is formed between the first and second walls;

a retaining member slidably mounted within the space between the first and second walls, the retaining member being movable between a first position in which a retaining portion of the retaining member blocks at least a portion of the main opening such that the retaining member is adapted to retain the object within the storage region, and a second position in which the retaining portion is at least partially retracted from the main opening such that the object can be inserted into or removed from the storage region;

first locking members connected to the retaining member for locking the retaining member in the first position, the first locking members being arranged and configured to resiliently move into the first locking openings when the retaining member is moved to the first position; and second locking members connected to the retaining member for locking the retaining member in the first position, the second locking members being arranged and configured to resiliently move into the second locking openings when the retaining member is moved to the first position.

12. The security case of claim 11, wherein the first and second locking members comprise cantilever members.

13. The security case of claim 12, wherein the cantilever members include pawls adapted to project into the first and second locking openings.

14. The security case of claim 13, wherein the pawls have first inclined surfaces.

15. The security case of claim 14, wherein the first and second walls include second inclined surfaces that oppose the first inclined surfaces of the pawls, wherein contact between the first and second inclined surfaces causes the retaining member to be elastically biased toward the second position.

16. The security case of claim 11, wherein the object comprises a compact disk case.

17. A security system for securing an object desired to be secured, the system comprising:

a case including a first side positioned opposite from a second side, the case defining a storage region formed generally between the first and second sides;

the case including a first wall that extends along the first side of the case, the first wall defining a plurality of first locking openings that extend completely through the first wall;

the case including a second wall that extends along the second side of the case, the second wall defining a plurality of second locking openings that extend completely through the second wall, the first an second walls being arranged in opposing relation such that a space is formed between the first and second walls;

a retaining member slidably mounted within the space between the first and second walls, the retaining member being movable between a first position in which the retaining member is adapted to retain the object within the storage region, and a second position in which the object can be inserted into or removed from the storage region;

first locking members connected to the retaining member for locking the retaining member in the first position, the first locking members being arranged and configured to resiliently move into the first locking openings when the retaining member is moved to the first position;

second locking members connected to the retaining member for locking the retaining member in the first position, the second locking members being arranged and configured to resilienty move into the second locking openings when the retaining member is moved to the first position; and an unlocking tool including opposing first and second jaws, the first jaw including first unlocking members arranged and configured to fit within the first locking openings, the second jaw including second unlocking members arranged and configured to fit within the second locking openings, wherein the first and second locking members are displaced from their corresponding first and second locking openings by positioning the case between the first and second locking jaws, aligning the first unlocking members with the first locking openings and the second unlocking members with the second locking openings, and pressing the first and second jaws together such that the first and second locking members displace the first and second locking members from their corresponding first and second locking openings.

18. The security system of claim 17, wherein the unlocking members include inclined surfaces arranged and configured for moving the retaining member from the first position toward the second position.

19. The security system of claim 17, wherein the locking members include inclined surfaces arrange and configured for causing the retaining member to be moved from the first position toward the second position by the unlocking members.

20. The security system of claim 17, wherein the locking members and the unlocking members include inclined surfaces that cooperate to move the retaining member from the first position toward the second position after the first and second resilient locking members have been displaced from the locking the first locking openings and the second locking openings, respectively.

21. A security system for securing an object desired to be secured, the system comprising:

a case housing including a first side positioned opposite from a second side, the case housing defining a storage region formed generally between the first and second sides, the first side of the case housing defining a main opening sized and shaped for allowing the object to be inserted into or removed from the storage region;

the case housing including a first wall that extends along the first side of the case housing, and a second wall that extends along the second side of the case housing, the first and second walls being arranged in opposing relation such that a space is formed between the first and second walls;

at least one of the first and second walls defining a plurality of through-holes;

a retaining member slidably mounted within the space between the first and second walls, the retaining member being movable between a first position in which a retaining portion of the retaining member blocks at least a portion of the main opening such that the retaining member is adapted to retain the object within the storage region, and a second position in which the retaining portion is at least partially retracted from the main opening such that the object can be inserted into or removed from the storage region;

first locking members connected to the retaining member for locking the retaining member in the first position the first locking members being arranged and configured to resiliently move into the through-holes when the retaining member is moved to the first position;

an unlocking tool including unlocking members arranged and configured to fit within the through-holes, wherein the locking members are displaced from the through-holes by pressing the unlocking members into the through-holes such that the locking members are flexed inward toward the space between the first and second walls; and means for automatically moving the retaining member from the first position toward the second position after the locking members have been displaced from the through-holes.

* * * * *